United States Patent [19]

Kobayashi et al.

[11] 3,710,363

[45] Jan. 9, 1973

[54] SIGNAL TRANSMISSION SYSTEM

[75] Inventors: Kengo Kobayashi, Kawasaki; Mitsuo Manabe, Tokyo, both of Japan

[73] Assignee: Fujitsu Limited, Kawasaki, Japan

[22] Filed: Nov. 23, 1970

[21] Appl. No.: 91,991

[30] Foreign Application Priority Data

Nov. 28, 1969 Japan ................................44/95542

[52] U.S. Cl...........340/213 R, 340/267 R, 340/253 B

[51] Int. Cl..............................................G08b 21/00

[58] Field of Search.....178/69 E, 69 F; 340/213, 176

[56] References Cited

UNITED STATES PATENTS 2,751,578 6/1956 Johannesson .........................340/213

*Primary Examiner*—Thomas B. Habecker

*Attorney*—Curt M. Avery, Arthur E. Wilfond, Herbert L. Lerner and Daniel J. Tick

[57] ABSTRACT

Noises are generated in signal lines connecting an electronic circuit in the digital controller with a limit switch and a relay in the controlled machine and these noises cause the electronic circuit in the digital controller to misoperate. This invention eliminates the above defect by the use of a noise filter of a simple circuit constitution, comprising an electrostatic screening type transformer, an oscillation circuit being attached to the primary winding of said transformer, current generated in the secondary winding of said transformer being rectified and converted into DC signals, said DC signals being opened and closed by a switch, the oscillation and non-oscillation of said oscillation circuit being controlled corresponding to said opening and closing, a charge-and-discharge circuit being controlled by the oscillation and non-oscillation of said oscillation circuit, and DC signals being generated corresponding to the opening and closing of said switch.

1 Claim, 2 Drawing Figures

SIGNAL TRANSMISSION SYSTEM

DESCRIPTION OF THE INVENTION

This invention relates to a noise filter in a digital controller for controlling a machine.

In the process control using electronic computers and in the numerical control of general machine tools, gas cutters and drafters, noise waves generated from motors, control relays, thyristors and solenoids in heavy current circuits such as input output devices and controlled machines are propagated by induction propagation through control signal lines to electronic control circuits including logical circuits to cause noise faults. Induction of the noise waves has heretofore been prevented by the use of a coupler comprising an electrostatic shield type transformer and by electrostatically separating the controlled machine side from the control logic side, but this method makes the circuit constitution complicated as a high-frequency chopping circuit for the digital input and other circuits are required.

This invention has achieved the simplification of the circuit constitution by providing an oscillator in a coupler and utilizing the winding belonging to said oscillator as the winding of an electrostatic screening type transformer. The signal transmission system of this invention comprises a transformer, the primary winding of said transformer being electrostatically screened and insulated from the secondary winding said transformer, an oscillator connected to said primary winding, a rectifying circuit connected to said second winding, a switching circuit connected to the output side of said rectifying circuit through a transmission line, and a charge-and-discharge circuit connected to the output side of said oscillator through a rectifier and is characterized in that the voltage of the output end of said rectifying circuit is varied corresponding to the opening and closing of said switching circuit, whereby the oscillation state of said oscillator is represented as the presence or absence of the terminal voltage of said large-and-discharge circuit.

Figure 1:
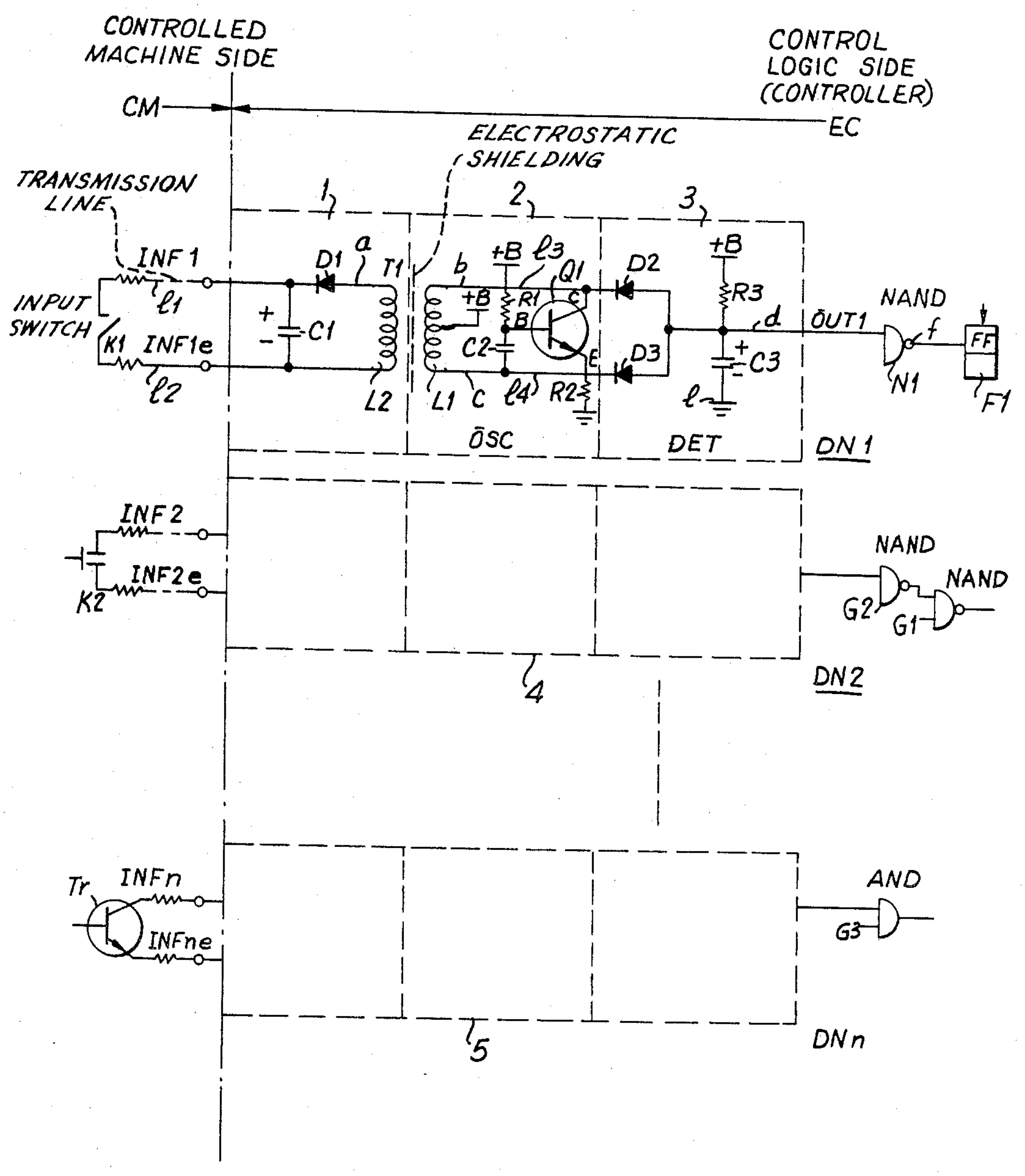
Figure 2:
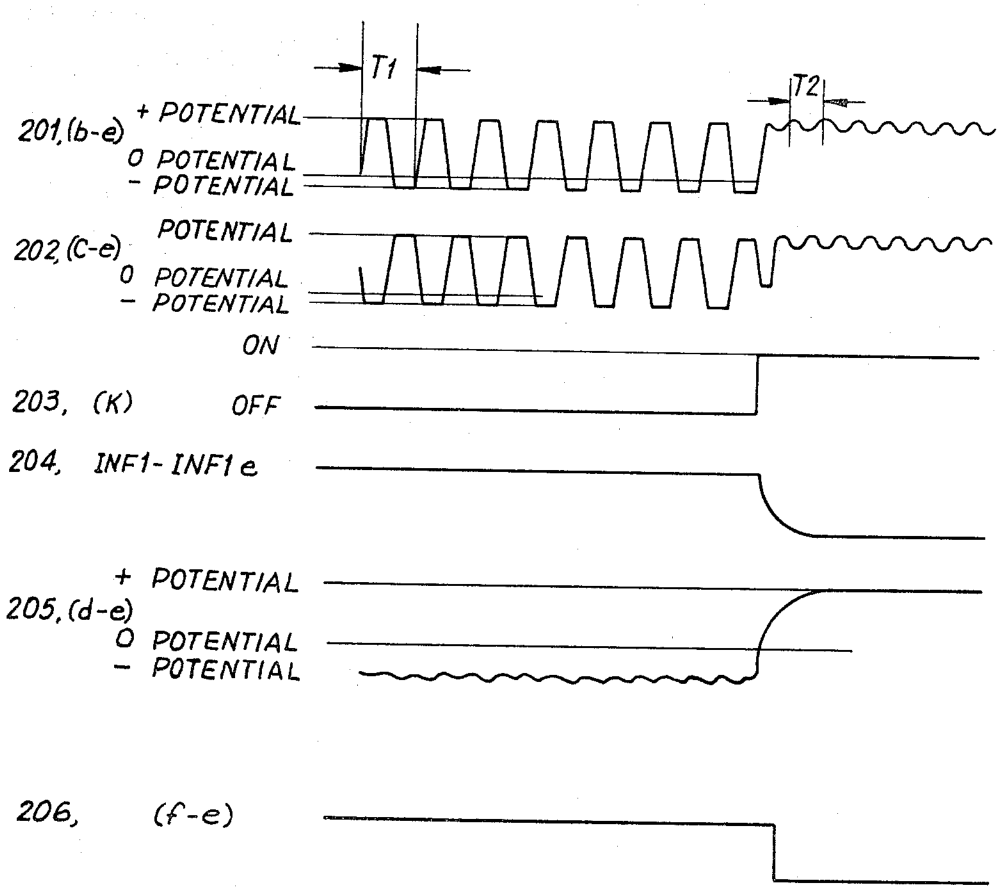

In order that the invention may be readily carried into effect, it will now be described with reference to the accompanying drawings, wherein:

FIG. 1 shows an embodiment of the signal transmission system of this invention; and FIG. 2 is a diagram for explaining the operation of said embodiment.

In FIG. 1, DN1, DN2 . . . DN*n* are transmission lines for transmitting on-off signals from the controlled machine side to logical circuits in the electronic circuit side through coupling circuits according to this invention. In transmission line DN1, rectifying circuit 1 constituting a coupler is connected to contact K1 on the side of the machine such as a machine tool through transmission lines *l*1, *l*2. This coupler comprises rectifying circuit 1, oscillation circuit 2 and detecting circuit 3. In an electrostatic shield type pulse transformer T1, the primary winding L1 is separated from the secondary winding L2, and an end of said secondary winding L2 is connected to line *l*1 through diode D1. The other end of winding L2 is connected to line *l*2, and capacitor C2 is connected between the cathode of diode D1 and the other end of winding L2 to form a rectifying circuit. Positive power source +B is connected to an intermediate tap of the primary winding L1 of pulse transformer T1, and one end of the primary winding L1 is connected to the collector of oscillating transistor Q1 through line *l*3. Line *l*4 connected with the other end of the primary winding L1 is connected to positive power source +B through a series circuit of capacitor C2 and resistor R1. The base of transistor Q1 is connected to power source +B through resistor R1 and the emitter of transistor Q1 is earthed through resistor R2. A series circuit of resistor R3 and capacitor C3 is provided in detecting circuit 3 for detecting the oscillation state of transistor Q1, an end of resistor R3 being connected to positive power source +B and the other end of capacitor C3 being earthed. Point *d* of connection of resistor R3 and capacitor C3 is connected to the collector of transistor Q1 through diode D2 and said point *d* is also connected to line *l*4 through diode D3. Thus detecting circuit 3 constitutes a charge-and-discharge circuit. The output of point *d* is given through NAND circuit N1 of the electronic circuit to flip-flop F1 as the output of the coupler.

FIG. 2 is a wave-form diagram for explaining the operation of the circuit of FIG. 1. In FIG. 2, 201 and 202 show voltages generated in the primary winding L1, 203 shows on-off signals of contact K, 204 shows the voltage between lines *l*1 and *l*2, 205 shows the potential of point *d*, and 206 shows the potential of point *f*.

Next the operation of the circuit of FIG. 1 will be explained. As described above, an oscillation circuit is constituted by transistor Q1, pulse transformer T1, resistor R1 and capacitor C2. This oscillation circuit is always oscillating when switch K1 provided on the side of the controlled machine is opened, and the oscillation amplitude becomes maximum when switch K is off as shown in FIG. 2–201, 202. Oscillation period T1 at this time is affected by the hysteresis characteristic of the pulse transformer, capacitor C2, resistor R1 and the load resistance on the secondary side Primary winding L1 of pulse transformer T is electrostatically shielded and insulated from secondary winding L2 thereof and the current generated in the secondary winding is converted into DC voltage by rectifying circuit 1. On-off informations are received from signal transmission lines *l*1, *l*2 and when switch K1 is "on", rectifying circuit 1 is short-circuited in the manner of the direct-current and the oscillation energy is consumed through rectifying circuit 1 and is attenuated as shown in FIG. 2–201, 202 and oscillation period T2 is also attenuated compared with T1. The amount of the oscillation energy is taken out by detecting circuit DET3 comprising diodes D2, D3, resistor R3 and capacitor C3, with the result that the on-off informations of switch K1 can also be taken out. When switch K1 is "off", as shown in FIG. 2–201, 202, the oscillation energy becomes maximum and becomes rectangular waves which are varied from the negative potential to the positive potential. When the oscillation wave form is negative, the oscillation amplitude is cramped to the negative potential and when the oscillation wave form is positive, capacitor C3 is charged through resistor R3. A rectifying action can be obtained by setting the charge time constant of capacitor C3 at a large value and setting the discharge time constant thereof at a small value, so that the oscillation wave form does not appear at output OUT. When switch K1 is closed and the oscillation energy becomes minimum or stops, the oscillation amplitude is cramped to the positive potential by diodes D2 and D3. Signals for driving IC (transistor integrated circuit) logical elements such as NAND gate N1 and flip-flop F1 of the electronic circuit including the logical circuit can be obtained by this output OUT. In FIG. 1, 4 and 5 are couplers of the other signal transmission lines. On-off informations are given by contact signals of relay, push-button switch K2 or "on" and "off" of transistor Tr of FIG. 1. It is also possible to receive the signals in the "or" manner by providing a tertiary winding and a rectifying circuit in the oscillation circuit.

As described above, according to this invention, the oscillation frequency can be made as high as 100KHz to 10MHz as an oscillator is used and for this reason an excellent transmission characteristic can be realized and as the winding of the oscillator can be utilized as the winding of the coupler, the circuit can be simplified.

We claim:

1. A digital signal transmission system between a machine and a controller in which the ON-OFF signal of a switching circuit of the machine is transmitted to the controller through a pair of ungrounded transmission lines, said digital signal transmission system comprising a transformer having a primary winding and a secondary winding electrostatically shielded and electrically insulated from the primary winding;

an oscillator comprising the primary winding of the transformer, oscillating means connected to the winding and an output circuit connected to the primary winding;

first rectifying means connected to the secondary winding of the transformer and having a rectified output, the transmission lines being connected to the output of the first rectifying means;

second rectifying means charging means;

said second rectifying means connecting said charging means to the output circuit of the oscillator, wherein the voltage at the output of the first rectifying means is varied corresponding to the opening and closing of the switching circuit, and the oscillation state of the oscillator is represented as the presence or absence of a terminal voltage of the charging means.

* * * * *